Sept. 23, 1958 R. E. SKOW 2,852,842
METHOD OF FORMING AND APPLYING CLASPS TO ENVELOPES
Filed Oct. 18, 1954 11 Sheets-Sheet 2
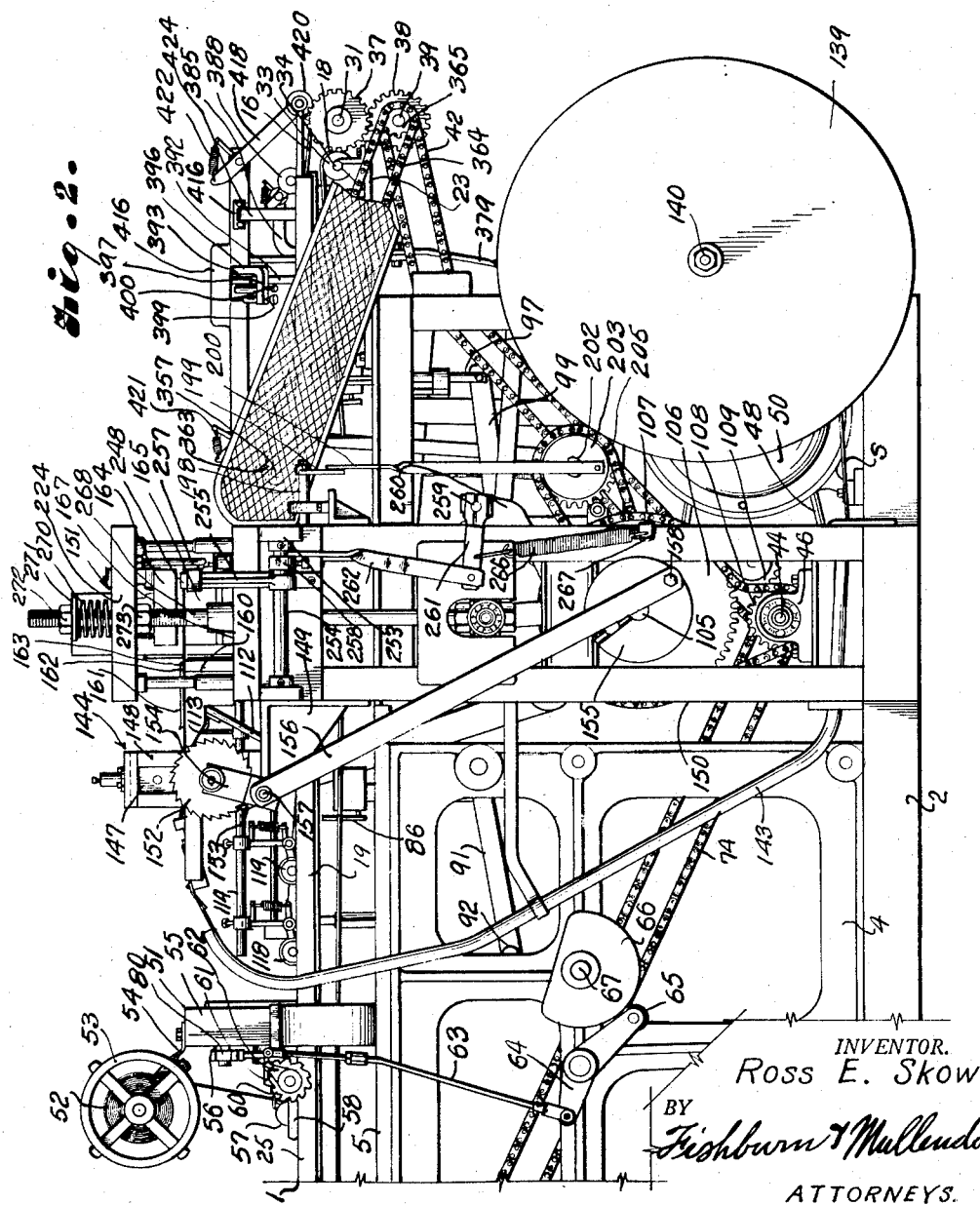
INVENTOR.
Ross E. Skow
BY
Fishburn & Mullendore
ATTORNEYS.

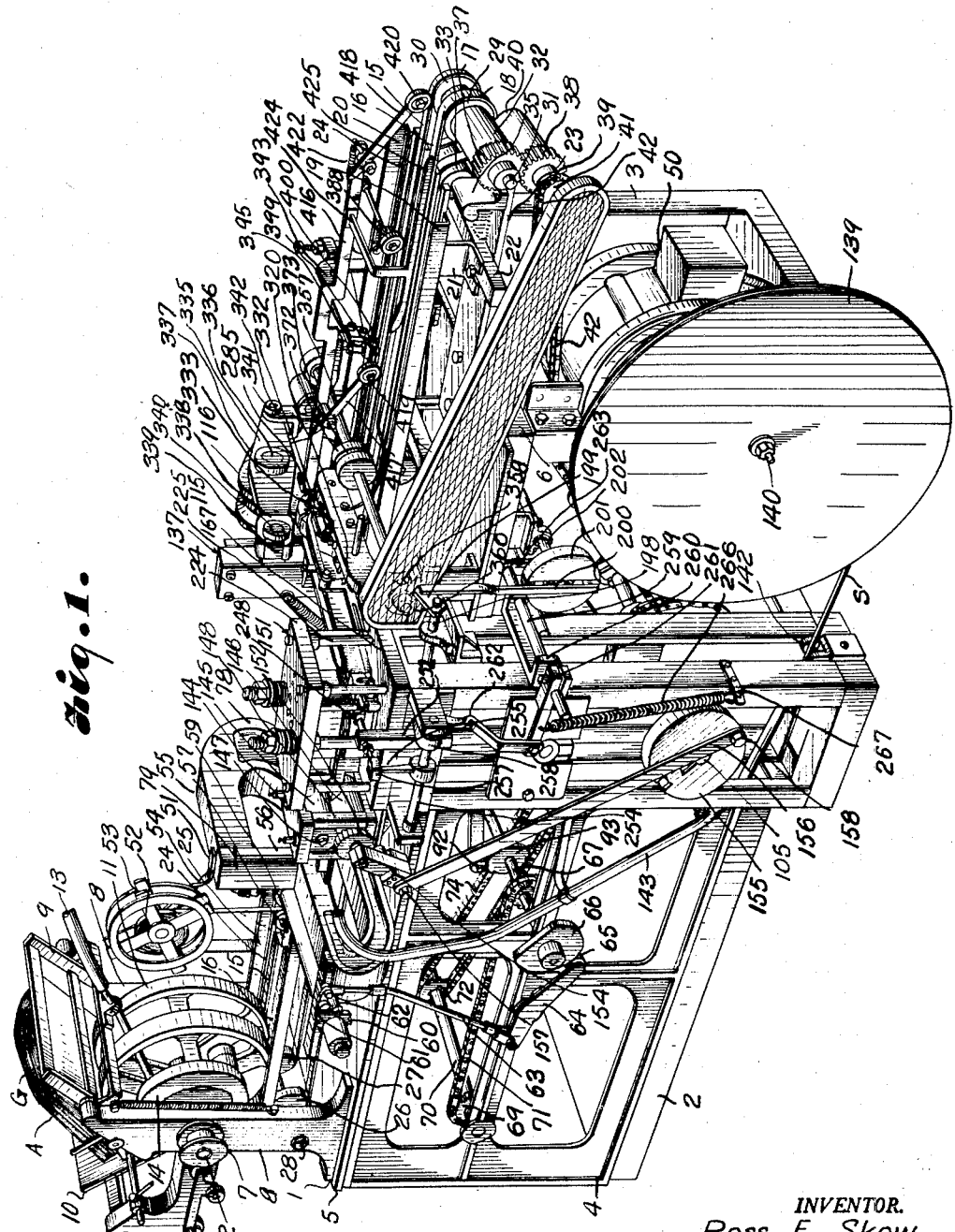

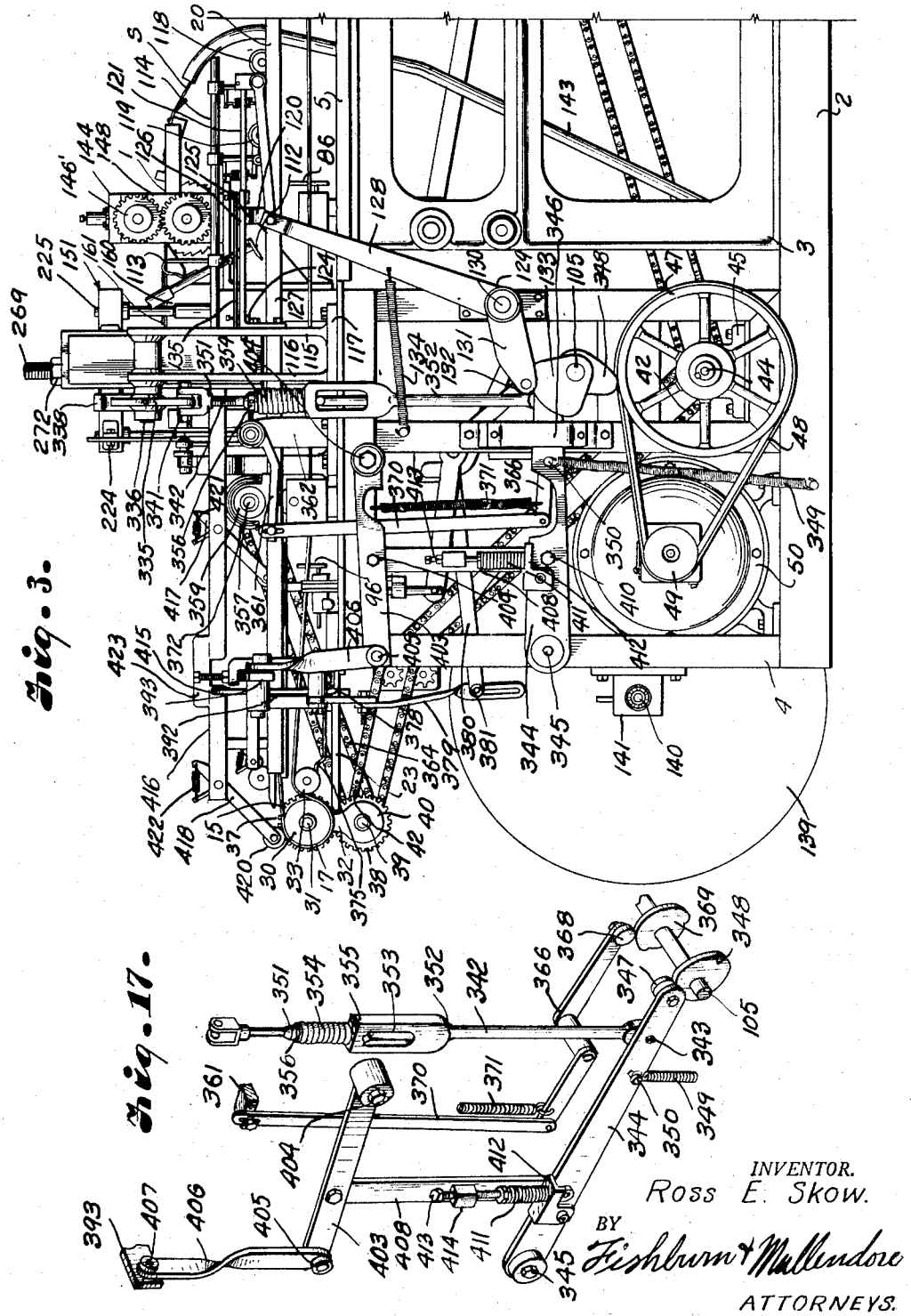

Sept. 23, 1958 R. E. SKOW 2,852,842
METHOD OF FORMING AND APPLYING CLASPS TO ENVELOPES
Filed Oct. 18, 1954 11 Sheets-Sheet 4

INVENTOR.
Ross E. Skow
BY
Fishburn & Mullendore
ATTORNEYS.

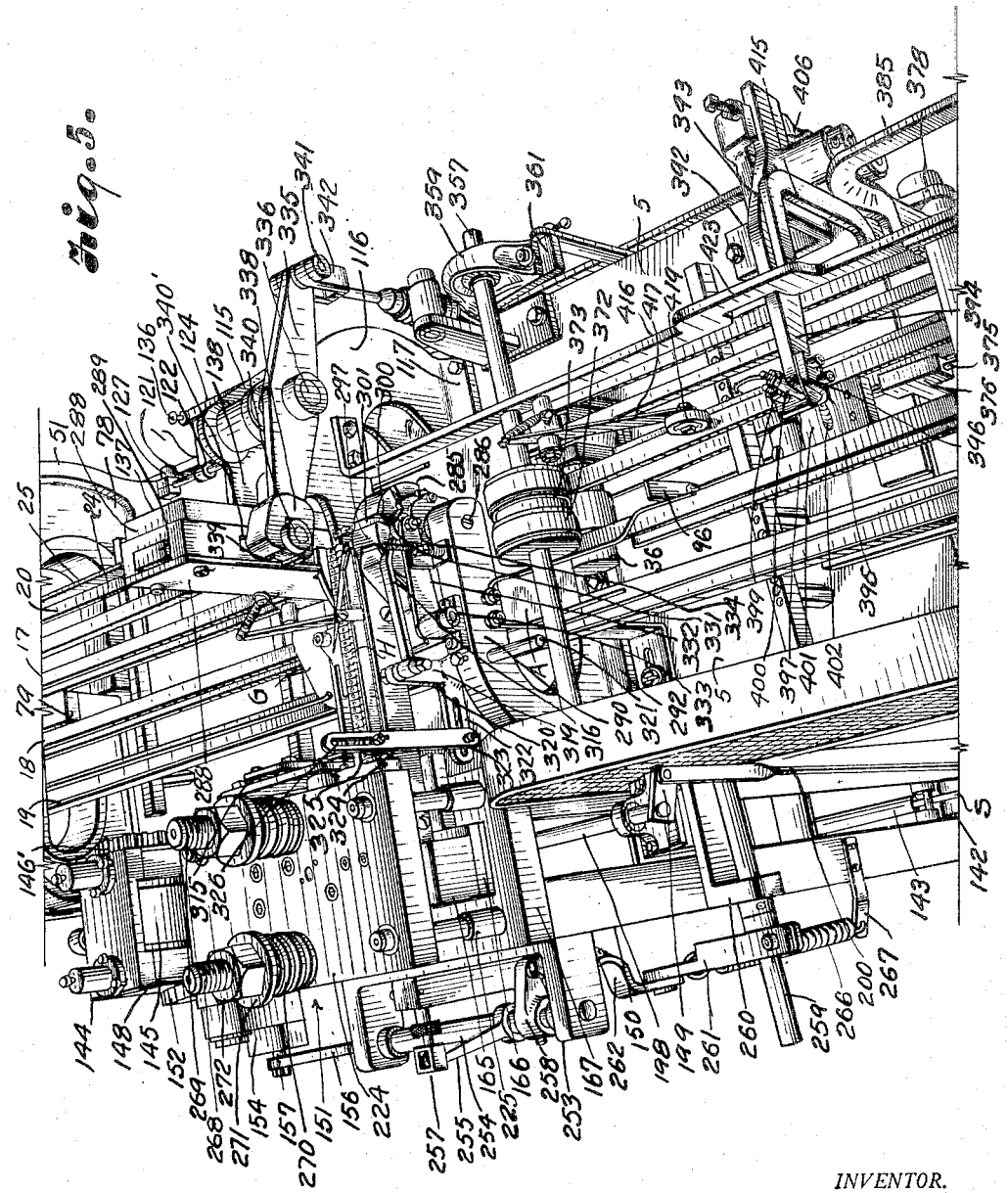

Sept. 23, 1958        R. E. SKOW        2,852,842
METHOD OF FORMING AND APPLYING CLASPS TO ENVELOPES
Filed Oct. 18, 1954        11 Sheets-Sheet 6
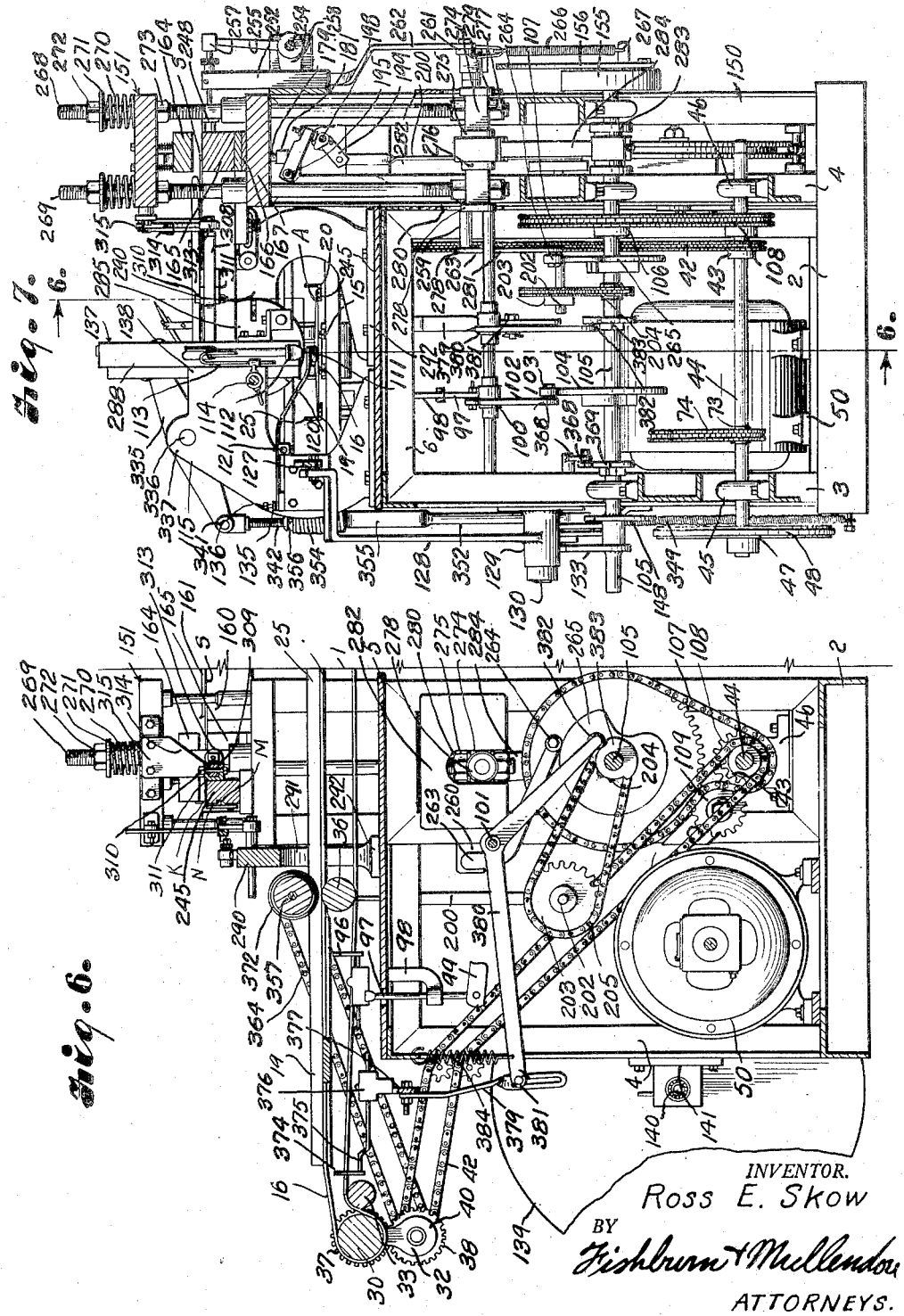
INVENTOR.
Ross E. Skow
BY
Fishburn + Mullendor
ATTORNEYS.

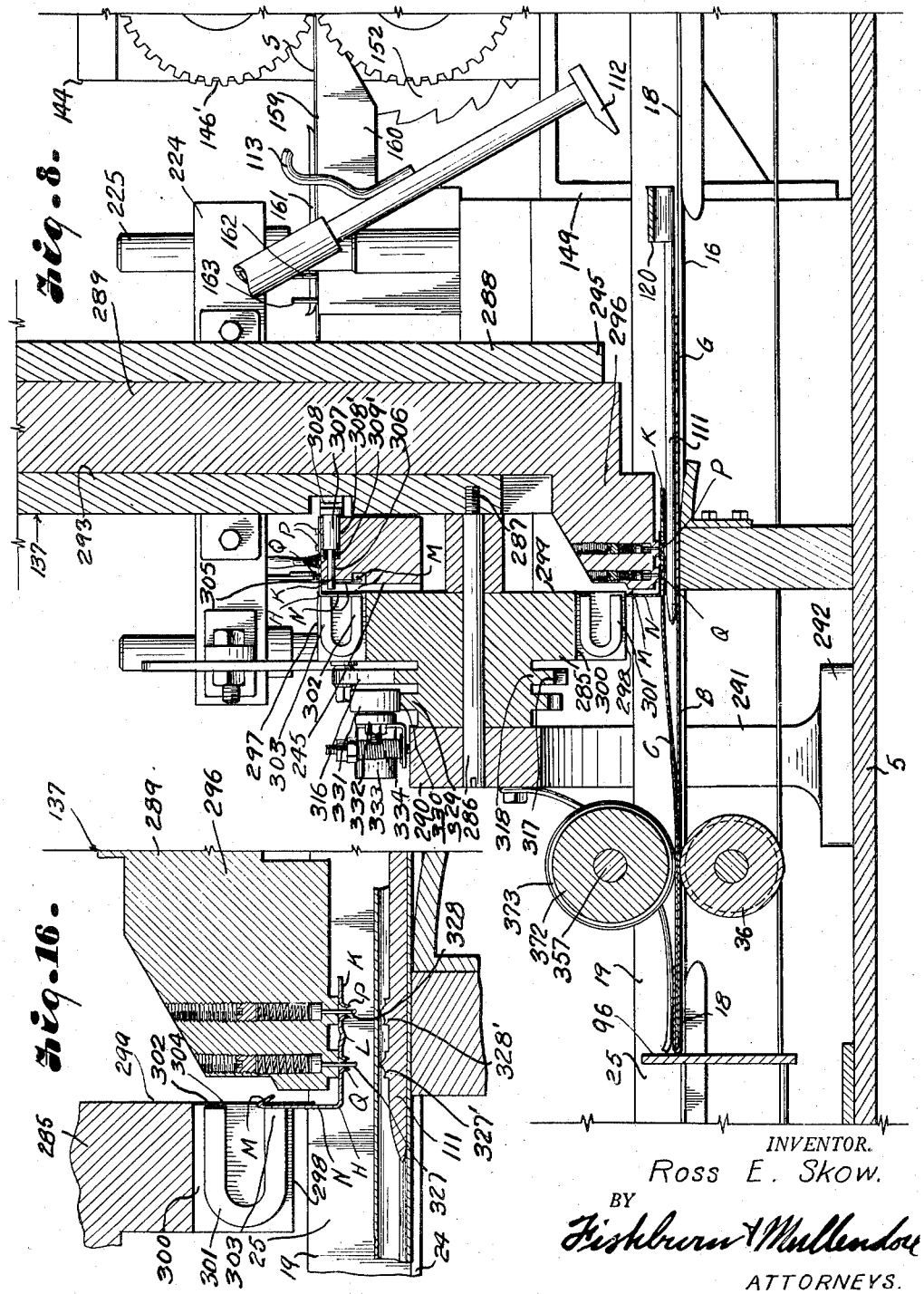

Sept. 23, 1958 R. E. SKOW 2,852,842
METHOD OF FORMING AND APPLYING CLASPS TO ENVELOPES
Filed Oct. 18, 1954 11 Sheets-Sheet 8
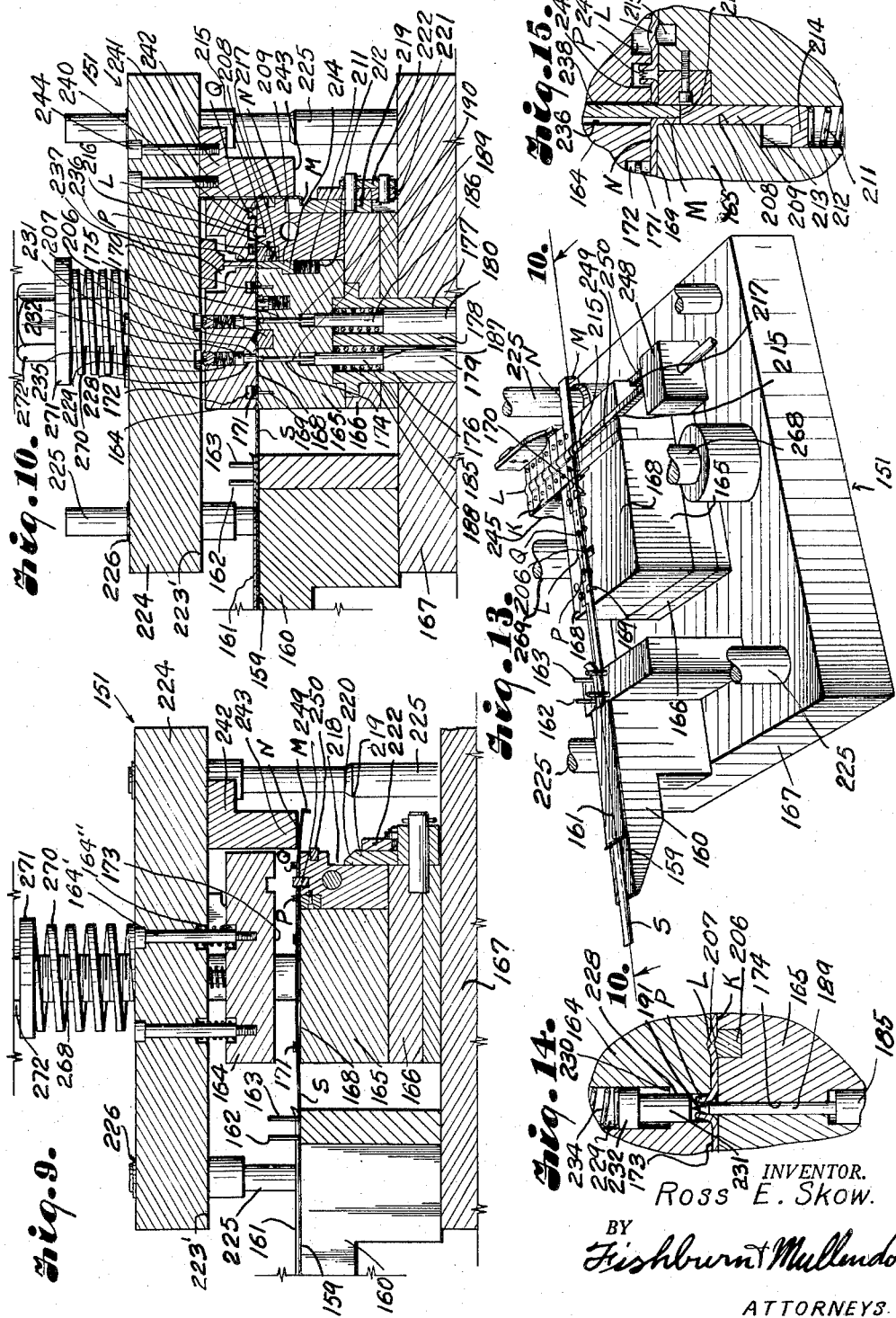
INVENTOR.
Ross E. Skow.
BY
Fishburn & Mullendore
ATTORNEYS.

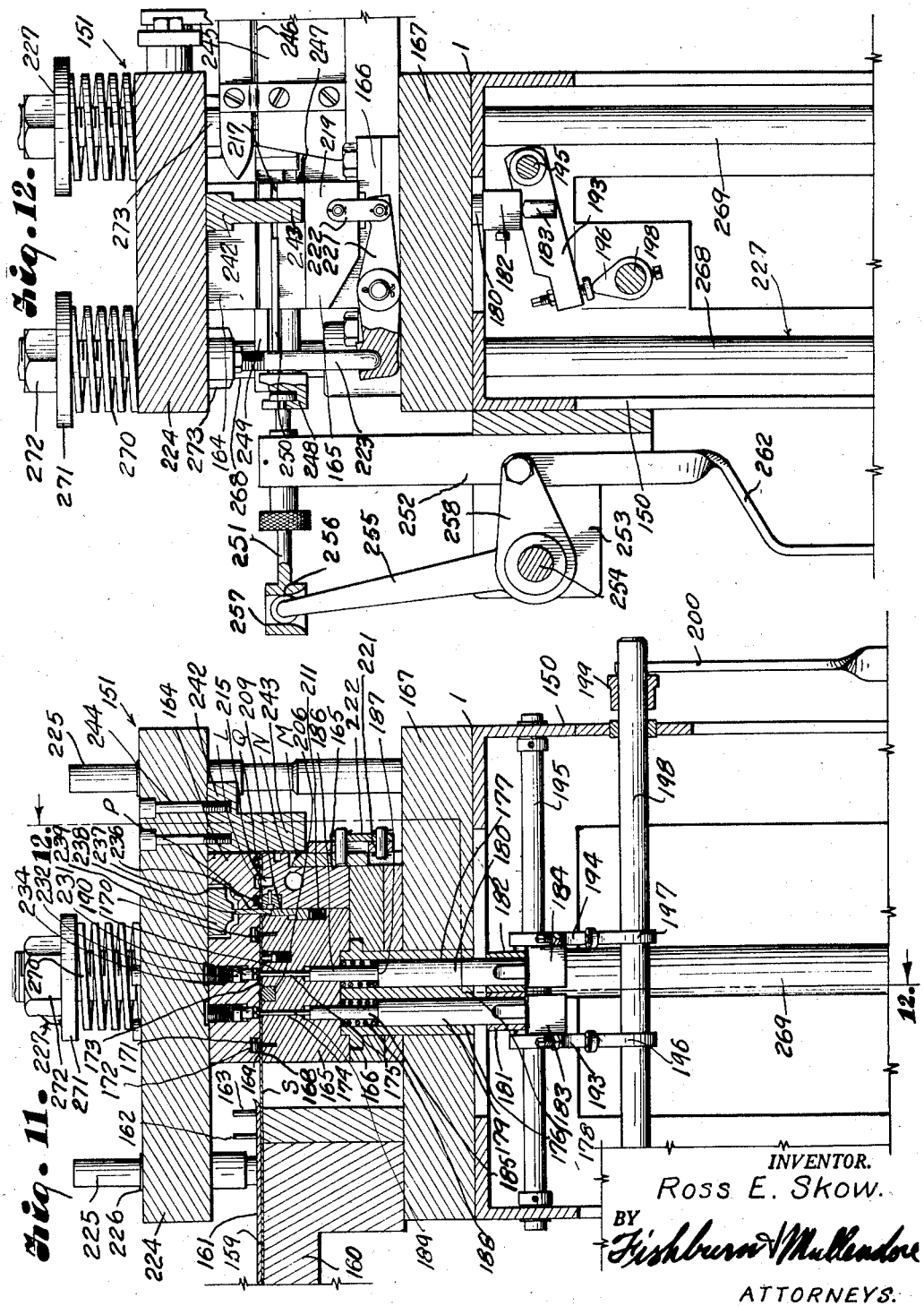

Sept. 23, 1958 R. E. SKOW 2,852,842
METHOD OF FORMING AND APPLYING CLASPS TO ENVELOPES
Filed Oct. 18, 1954 11 Sheets-Sheet 10
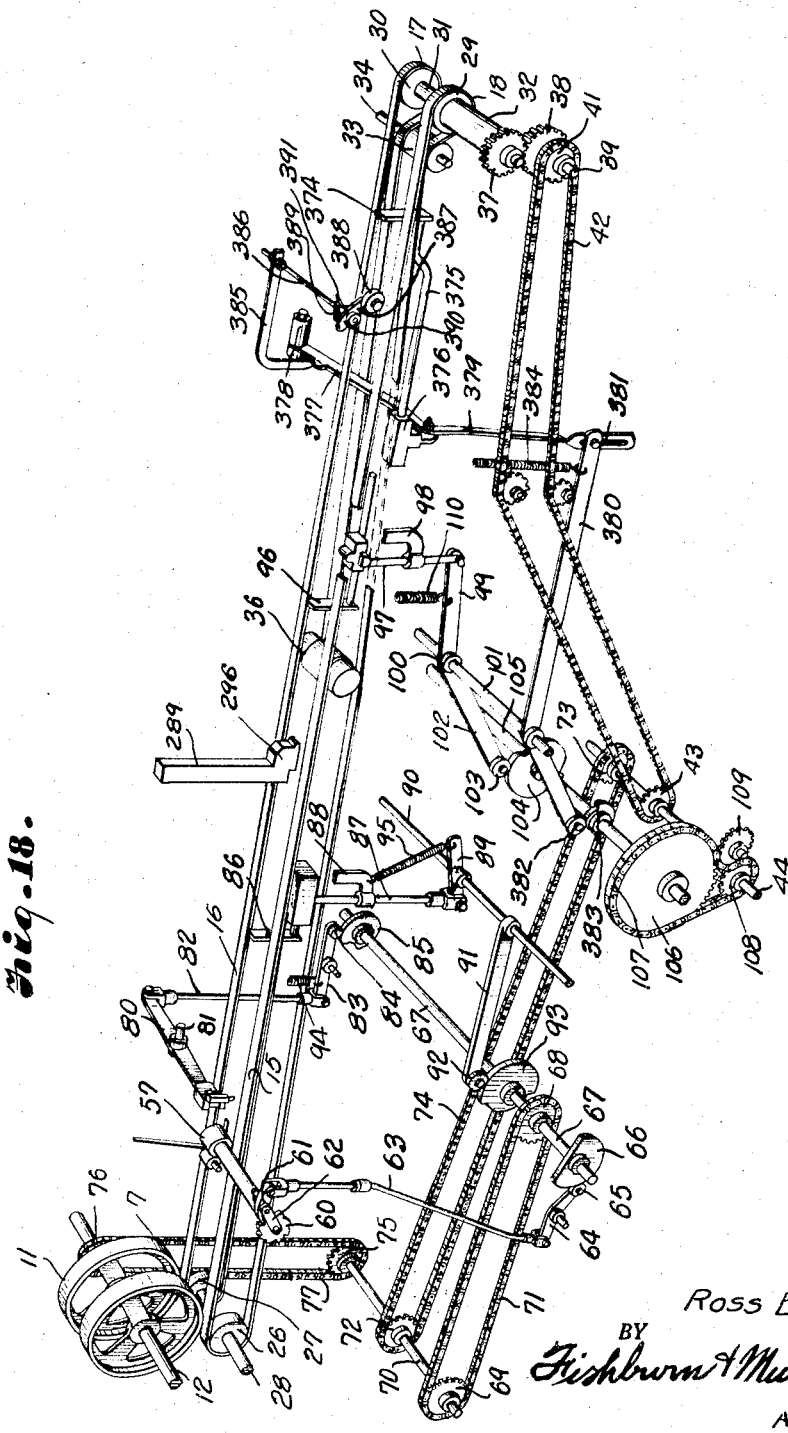
INVENTOR.
Ross E. Skow
BY
Fishburn & Mullendore
ATTORNEYS Sept. 23, 1958 R. E. SKOW 2,852,842
METHOD OF FORMING AND APPLYING CLASPS TO ENVELOPES
Filed Oct. 18, 1954 11 Sheets-Sheet 11
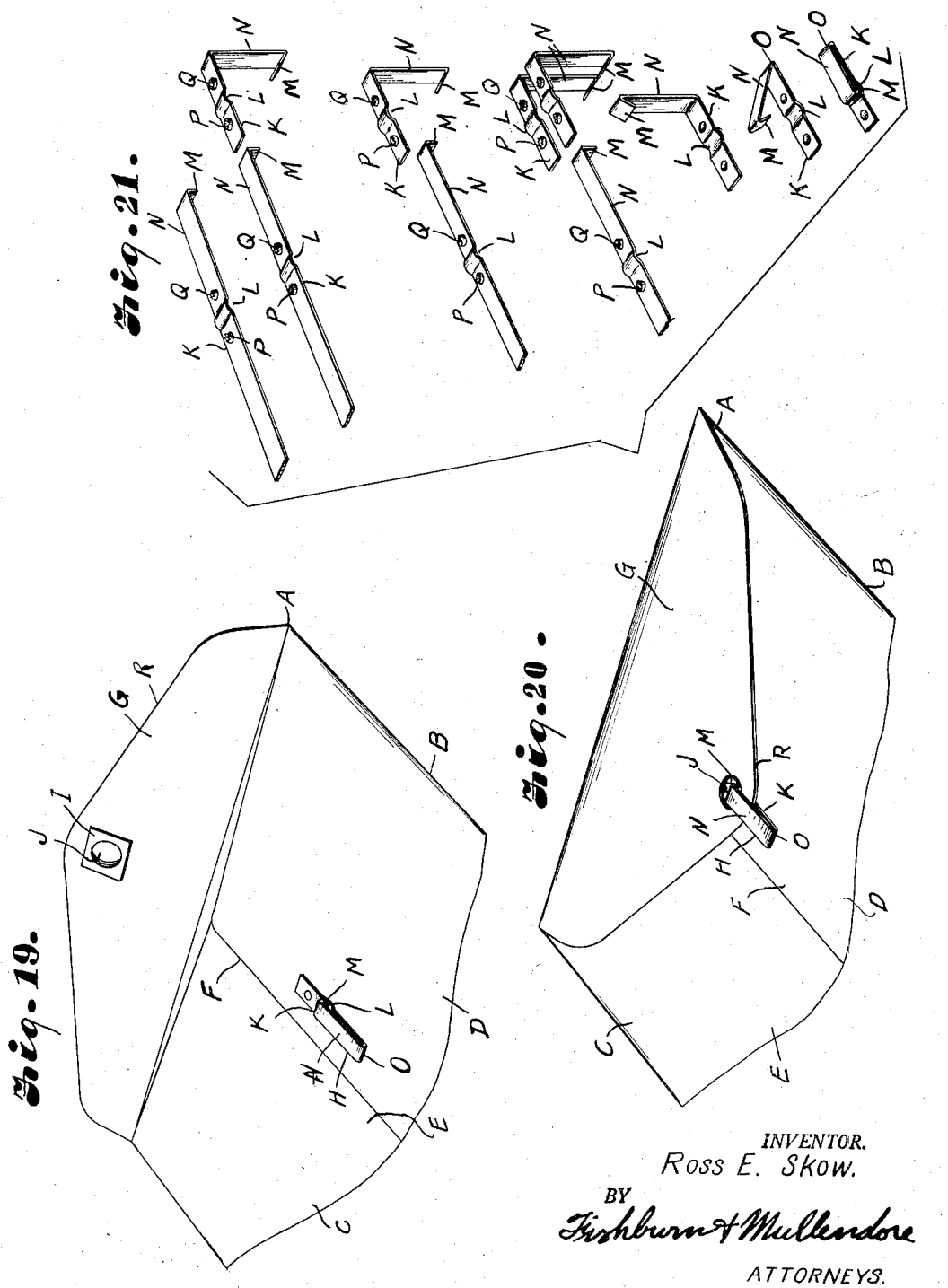
INVENTOR.
Ross E. Skow.
BY
Fishburn & Mullendore
ATTORNEYS.

United States Patent Office 2,852,842
Patented Sept. 23, 1958

2,852,842

METHOD OF FORMING AND APPLYING CLASPS TO ENVELOPES

Ross E. Skow, Kansas City, Mo., assignor, by mesne assignments, to Tension Envelope Corporation of Kansas City, Kansas City, Mo., a corporation of Delaware Application October 18, 1954, Serial No. 462,723

12 Claims. (Cl. 29—509)

This invention relates to a method of applying clasps to envelopes, the clasp being of a type disclosed in United States Letters Patent 2,349,127, issued May 16, 1944.

The principal objects of the present invention are to provide a method of forming the clasp-blanks from rolled strip material, feeding the clasp blanks and envelopes into position for application of the clasp blanks to the envelopes and completing the formation of the clasp blanks into clasps after attachment of the clasp blanks to the envelopes.

Other objects of the invention are to provide a method for forming the clasp-blanks from rolled strip material and feeding the blanks in timed relation with feed of the envelopes; to transfer the clasp blanks magnetically from a reserve series of blanks progressively advanced from the place of forming to effect removal of clasps in case of skipped envelopes or any malformed clasps; and to provide for control of the envelopes as well as the clasp-blanks during the steps of formation of the clasp blanks and application thereof to the envelopes.

In accomplishing these and other objects of the invention hereinafter pointed out, I have provided an improved method and apparatus, the preferred form of which is illustrated in the accompanying drawings wherein:

Fig. 1 is a perspective view of a machine constructed in accordance with the present invention and which is particularly adapted for making and attaching clasps to envelopes by my improved methods.

Fig. 2 is a side elevational view of the portion of the machine.

Fig. 3 is a side elevational view of the corresponding opposite side of the machine.

Fig. 4 is a plan view of the machine.

Fig. 5 is a perspective view of the clasp blank forming and applying sections of the machine as viewed from above.

Fig. 6 is a fragmentary longitudinal section through the machine on the line 6—6 of Fig. 7.

Fig. 7 is a cross section through the machine on the line 7—7 of Fig. 4.

Fig. 8 is an enlarged fragmentary section through the machine on the line 8—8 of Fig. 4, looking in the direction of the arrows.

Fig. 9 is an enlarged longitudinal section through the blank forming dies and die shoes, showing the dies in spaced relation for entrance of the strip material and advancement of a partially formed blank, formed by the dies on a previous operation, the section being taken through both dies at the point indicated by the line 9—9 on Fig. 4.

Fig. 10 is a similar section showing the dies closed to form additional operations on the partially formed blank and severing a blank from a partially formed blank, the section being taken through both dies along a line indicated by the line 10—10 on Fig. 13.

Fig. 11 is a section through the dies similar to Fig. 10 but showing complete closure of the dies and projection of the punch pins that form the prongs on the clasps.

Fig. 12 is a section through the dies on the line 12—12 of Fig. 11.

Fig. 13 is a perspective view of the lower die shoe and lower die carried thereby, particularly illustrating the transfer device for removing the blanks from the die and aligning the blanks for advancement along a guide rail to the magnetic transfer device.

Fig. 14 is an enlarged fragmentary section showing formation of the prongs on the clasps.

Fig. 15 is an enlarged section showing the operation of cutting off the individual clasps and bending the hook terminals on the clasp-blanks.

Fig. 16 is an enlarged section through the foot of the clinch and anvil and particularly illustrating the pins for positioning the clasps on the envelopes.

Fig. 17 is a detailed perspective view of the cam and levers for actuating the clinch and the mechanisms for producing the final shaping of the clasps after they have been applied to the envelopes.

Fig. 18 is a diagrammatically perspective view of the various envelope stops and operating parts of the machine.

Fig. 19 is a perspective view of an envelope showing the reinforcing washer and clasp applied thereto with the closure flap in open position.

Fig. 20 is a similar view showing the closure flap of the envelope in closed position and secured by the clasp.

Fig. 21 is a diagrammatical view, showing the various steps of forming a rolled strip into a clasp-blank.

Referring more in detail to the drawings:

1 designates a machine used in making and applying clasps to envelopes, the clasps and envelopes being of a type disclosed in the above numbered patent, and shown in Figs. 19 and 20.

It will be noted in Figs. 19 and 20 that the envelope A is of conventional type in that it has a front side B and a back side C that is formed by side flaps D and E folded over the front side and secured together in lapped relation to form a central seam F having two ply thickness. The front side of the envelope has a closure flap G which is adapted to be folded over the insert opening and secured to the clasp H, the flap G being preferably provided on the inner face with a washer I that is secured by a suitable adhesive and which has an opening J punched therethrough and through the material of the closure flap G.

The clasp H is formed by the machine from a piece of rolled strip material to provide an elongated body portion K having a central transverse crimp or depression L for accommodating a hook-lie terminal M on a resilient tongue portion N that is integral with one end of the body portion and which is bent retractively as at O to bring the hook M into registry with the depression L. The clasp H is secured to the double-thick portion of the envelope that is provided by the central seam F by prongs P and Q that are stamped from the body portion at the respective sides of the transverse crimp L and which are projected through the envelope and clinched on the inner side thereof.

When the open end of the envelope A is to be closed, the closure flap G is folded over the insert opening and the free edge R is caused to pass between the hook M and the body K of the clasp until the hook is in position to pass through the opening J and engage the edge thereof as shown in Fig. 20.

When the flap G is to be opened, the tongue portion

N of the clasp is raised slightly to permit disengagement of the hook M with the opening J in the closure flap G whereupon the closure flap may be withdrawn from under the hook M, the particular feature of the envelope being the ease with which the closure flap is secured and released so that the envelope may be used many times without tearing of the flap G or breaking of the clasp H.

In carrying out the invention, the envelopes are withdrawn from the stack and advanced through a fixed path to the place of attachment of the clasp blanks, during which time the washers I are applied to the flaps of the envelopes and are punched to provide the openings J. The clasp blanks are formed of a continuous strip in timed relation with feed of the envelopes. The prongs P and Q and the crimp or depression L are first formed with the hook M initially bent at right angles, as shown in Fig. 21, after a previously completed clasp blank has been severed from the strip. The tongue portion N is then bent at right angles to the portion K and the hook M is initially bent at an angle of approximately 45° relatively to the tongue portion N. The clasp blanks are then advanced toward the place of attachment, but are inverted to bring the portions K into contact with the envelope with the tongues N extending upwardly in and out of way position for clinching the prongs, after which the envelopes carrying the clasps are advanced to stations where the formation of the clasps is completed, first by bending the tongue portions N to bring the partially formed hooks into the crimps L and then to flatten the bends for providing the desired resiliency in the tongue portions and to complete formation of the hook portions. In carrying out the method and in accordance with high production methods, a machine is utilized in accomplishing the steps of the method.

The machine 1 includes a base 2, supporting side frames 3 and 4, carrying a table-like top 5, the side frames being interconnected by transverse rails 6. Mounted on the head end of the table top 5 is a mechanism of the type disclosed in detail in U. S. Letters Patent No. 2,197,827 for feeding envelopes individually from a stack and applying washers to the closure flaps thereof. This mechanism specifically forms no part of the present invention, and will be briefly described to better relate the combination with the mechanism for making and applying the clasps.

The mechanism 7 includes spaced apart standards 8 carrying a support 9 for a stack of the envelopes A, with the closure flaps G open and the bottom edges resting upon an inclined shelf 10 with the bottom of the foremost envelope in contact with a withdrawal cylinder 11.

The cylinder 11 is rotatable about a horizontal axis on a shaft 12 having its ends journalled in suitable bearings carried by the standards 8, as shown in Fig. 1. The withdrawal cylinder 11 is of the vacuum type in that the periphery thereof has suction openings movable into engagement with the foremost blank and through which a suction is drawn by way of a duct 13 under control of a rotary valve 14. The foremost blank in the stack is therefore held against the cylinder and is carried downwardly about the periphery of the cylinder for deposit upon the upper runs 15 and 16 of the endless conveyor belts 17 and 18 when the vacuum is released. The envelope is carried by the belts with the sides thereof in guided contact with guide rails 19 and 20. The guide rails have rear ends suitably carried by the standards 8, and their forward ends extend above the table top 5, to the forward end of the machine where the rails are supported on brackets 21 carried by a cross rail 22 mounted on a forwardly projecting arm 23.

The guide rails are preferably angles to provide inwardly extending flanges 24 for support of the marginal side edges of the envelopes and to provide vertical flanges 25 for guiding the envelopes and retaining them in registry with the clasp applying mechanism later to be described.

The conveyor or envelope carrying belts are mounted at their rear ends on spaced rollers 26—27 that are carried below the withdrawal cylinder on a shaft 28, having its end rotatably mounted near the base of the standards so as to support the upper runs 15 and 16 of the belts 17 and 18 substantially in plane with the horizontal flanges 24 of the guide rails.

The belts 17 and 18 extend along the length of the machine and are guided over rollers 29 and 30 that are mounted on a transverse shaft 31. The shaft 31 is journalled in a bracket 32 that is carried on the projecting end of the arm 23. The lower runs of the belts extend upwardly over an idling roller 33 to increase contact of the rollers therewith. The roller 33 is carried by a shaft 34 journalled in a part 35 of the bracket 32. The lower runs of the belt, after extending over the roller 33, pass under a roller 36 and extend therefrom in substantially horizontal position to the rollers 26 and 27 as shown in Fig. 1.

The shaft 31 is driven by a gear 37 mounted thereon and meshing with a driving gear 38 carried on a shaft 39, the shaft 39 being rotatably mounted in a depending part 40 of the bracket 32 as shown in Fig. 1.

The driving shaft 39 which carries the driving gear 38, has a sprocket 41, and operating over the sprocket is a drive chain 42 operating over a sprocket 43 that is carried on a main counter-shaft 44, from which all of the various drives required in the machine are obtained.

The counter-shaft 44 extends transversely of the machine and has its ends journalled in bearings 45 and 46 that are carried by the side frames 3 and 4 of the machine as best shown in Fig. 7. The counter-shaft, in turn, is driven by a pulley 47 that is mounted on a projecting end thereof and which is operated by a belt 48, running over a pulley 49 on the power shaft of a motor 50. The motor 50 is mounted on the base 2 as best shown in Figs. 3 and 6.

When the envelopes are withdrawn from the stack and individually deposited upon the conveyor belts they pass through a mechanism 51, also disclosed in Patent No. 2,197,827 for applying the washer I, to the inner face of the closure flap and punching the hole J.

The washers are cut from a tape carried in a roll 52 mounted on a reel 53 that is rotatably carried by a bracket 54 from the frame 55 of the punch 56. The tape extends downwardly from the reel 53 and one side thereof is provided with an adhesive that is brought into contact with a moistening roller 57 rotatably in a moisture containing pan 58.

From the roller 57, the tape passes under a measuring roller 59 that is intermittently rotated a predetermined amount to feed the exact amount of tape required for the reinforcing washer I, the roller being actuated by a ratchet wheel 60, which is turned by a pawl 61 on a rocker arm 62 that is manipulated from a rocker arm 64 through a link 63. The rocker arm 64 carries a roller 65 that makes contact with a cam 66. The cam 66 is fixed to a transverse cam shaft 67 journalled in the side frames of the machine and carries a sprocket 68 that is driven from a sprocket 69 on a secondary counter-shaft 70, by a chain 71 operating over the respective sprockets.

The counter-shaft 70 is also journalled in the side frames and carries a sprocket 72 that is driven from a sprocket 73 on the main counter-shaft 44 previously described by means of a chain 74. The withdrawal cylinder 11 is also driven from the countershaft 70 by a chain 77 operating over a sprocket 75 on the shaft 70 and a sprocket 76 on the withdrawal cylinder shaft 12.

The punch 56 includes a base 78 that is mounted on the table below the guide rail 20, forwardly of the tape moistening and feed rollers to carry a punch head 79.

The punch head 79 mounts a punch and a knife that severs the measured tape to form the washer, presses the washer to the inner face of the closure flap of the underlying envelope and punches a hole through the washer and closure flap as disclosed in the above mentioned U. S. Letters Patent 2,197,827.

The punch is operated by means of a rocker arm 80 pivotally mounted on a pin 81 that extends rearwardly from the side of the arm 78 as best shown in Fig. 4. The rocker arm 80 projects over the adjacent side of the table top 5 and connects by means of a link 82 which connects with the rocker arm 83 that is pivotally mounted on the side frame of the machine, and carries a roller 84 in contact with a cam 85 mounted on the opposite end of the cam shaft 67.

The envelope, which has been advanced back side up, with the bottom edge foremost and with the closure flap open and trailing, is detained and held stationary under the punch mechanism until the washer application is complete, because a stop 86 has moved into the path of the bottom edge of the envelope.

The stop 86 is carried between the guide belts on a rod 87 which is reciprocably mounted in a guide bracket 88. The rod 87 is reciprocated in time with the other operating mechanisms of the machine by connection thereof with a rocker arm 89 fixed to a rocker shaft 90. The rocker shaft 90 is journalled between the side frames and is actuated by an arm 91 that extends rearwardly over the cam shaft 67 and carries a roller 92 that engages with the periphery of a cam 93 on the cam shaft 67 as best shown in Fig. 18. The rollers on the rocker arms 83 and 91 are kept in contact with the respective cams by springs 94 and 95 (see Fig. 18).

After the cutoff mechanism and punch has operated to apply the washer, the high lobe of the cam 93 moves out of contact with the roller 92 and the spring 95 moves a stop downwardly below the path of the envelope so that the belts are effective in advancing the envelope to the next station for application of the clasp.

The envelope is detained in position for receiving the clasp by means of a stop 96 that is also mounted between the belts on a rod 97 reciprocably supported in a bracket 98 also carried by the frame of the machine. The rod 97 is connected with an arm 99 of a rock lever 100 on a rock shaft 101 also extending traversely of the machine and having its ends journalled in the side frames. The rock lever also includes a rearwardly extending arm 102 carrying a roller 103 in contact with a cam 104 on a second cam shaft 105. The cam shaft 105 extends transversely of the machine and is rotatably mounted in the side frames similar to the cam shaft 67 previously described. The cam shaft 105 carries a sprocket 106 that is driven by a chain 107 operating over a sprocket 108 on the main counter-shaft 44 previously described, and idling sprocket 109 being provided to maintain the desired contact of the chain with the respective sprockets.

The stop 96 is retained in its up position and the roller 103 against the cam 104 by a spring 110 which connects the lever arm 99 with a fixed part of the frame.

When the envelope has been advanced to engagement with the stop 96, it is in position to be opened for reception of an anvil 111. The envelope is opened by a blast of air from a nozzle 112 that is supported with the discharge thereof directed upon the edge of the back side C of the envelope.

This causes the back side C of the envelope to separate from the front side D sufficiently to pass the anvil therebetween.

The nozzle 112 is carried on a bracket 113 that is adjustable along the rod 114 that extends rearwardly from one of a pair of spaced apart transverse plates 115—116. The plates 115—116 have foot flanges 117 secured to the side of the table top. The rod 114 extends rearwardly above the upper run 16 of the conveyor belt 18 and carries pressure rollers 118—119 to cooperate with the belts in advancing the envelope to the clasp attaching station.

The envelopes move over the anvil 111 so that when the closure flap G advances beyond the forward terminal of the anvil, the anvil is in position to move within the envelope. The anvil is supported from an arm 120 (Fig. 4) which is fixed to a rod 121 that is supported alongside the conveyor and for reciprocation in bearings 122 and 123 of a bracket 124 that is fixed to the table top 5.

The bracket 124 has a longitudinal guide 125 for the end 126 of the arm 120 so that the anvil is slidably supported at a fixed height. The arm 120 is shifted along the guide by means of a link 127, which pivotally connects with the upwardly and laterally extending arm 128 of a bell crank 129. The bell crank is pivotally mounted on a pin 130 that extends from the side frame 4, as best shown in Fig. 4 and has a forwardly extending arm 131 which carries a roller 132 operating on a cam 133, which is attached to the cam shaft 105. The arm 131 is held with the roller in contact with the cam 133 by a spring 134 having one end fixed to the lever and its opposite end fixed to a part of the frame as best shown in Fig. 3. The arm 120 is pivoted on the rod 121 by retaining an end of the arm under a guide strip 135 that is adjustably supported on the bracket 124 by adjusting screws 136 to adjust the level of the anvil.

The envelope is now in position and is prepared to receive a clasp-blank that is applied by an applicator 137 carried between arms 138 that project over the stopped envelope from the plates 115—116.

As previously stated, means are provided on the machine for forming the clasp blanks from a roll of metal tape S. The tape S is carried on a reel 139 rotatable upon a spindle 140, which is carried by a bracket 141 attached to the forward end of the side frame 3 (see Figs. 2, 3 and 4). The tape S is withdrawn from the reel and guided by a roller 142 into and through a tubular guide 143 that extends rearwardly and upwardly of the side frame 3 and terminates in a forwardly curving end from which the tape is drawn through a measuring device 144 which includes rollers 145 and 146, mounted on transverse shafts that are carried in bearings 147 within a frame 148. The frame 148 is carried on a bracket 149 that projects rearwardly from a lateral extension 150 of the side frame 3. The extension projects above the table top 5 to carry a forming mechanism 151, later to be described.

The roller 146 carries a ratchet wheel 152 that is fixed to the roller shaft and intermittently turned by means of a pawl 153, the pawl 153 being pivotally mounted on the side of a crank arm 154 arranged to swing on a projecting end of the shaft for the measuring roll 146, the crank arm being oscillated by a disk 155 through a connecting link 156 (see Figs. 1 and 2). The disk 155 is fixed to the outer end of the cam shaft 105. The link 156 is pivotally connected at one end with a laterally extending pin 157 on the crank arm 154 and the other end with a pin 158 that extends laterally from the disk 155 and in off-center relation therewith so that when the disk is rotated, the crank arm is oscillated to turn the roller 146 in a forward direction in cooperation with the other roller 145 in advancing the tape a predetermined distance for establishing the overall length of the material necessary to form the clasp H.

The roller 145 is driven by gears 146' which connect the shafts of the respective rollers.

The tape, when advanced by the measuring rollers, passes along the flap upper face 159 of a support 160 and under a guide plate 161 that extends longitudinally of the support 160 to guide the tape between pairs of guide pins 162 and 163 (Figs. 11 and 13).

The guide pins 162 and 163 assure lateral positioning of the tape S relatively to upper and lower die blocks 164 and 165. The lower die block 165 is supported on a plate 166 that is carried on a die shoe 167 of the frame extension 150. The die block is of substantially rectangular shape and has a flat upper face 168 across which the tape is fed by the mechanism 144. The tape is guided across the face 168 between pairs of pins 169 and 170 having heads 171 extending over marginal side of the tape and which are accommodated in recesses 172 in the lower face 173 of the upper die block 164. Formed in the lower die block in alignment with the longitudinal center of the tape are spaced bores 174 and 175 registering with larger bores 176 and 177 in an insert 178. The insert 178 is mounted within the plate 166 and extends downwardly therethrough and through the die shoe 167 as best shown in Fig. 11. Slidably mounted in the bores of the insert are plungers 179 and 180 having heads 181 and 182 on the lower ends for engagement with cam lugs 183 and 184. The plungers 179 and 180 have upwardly extending reduced portions 185 and 186 to form shoulders 187 for seating springs 188 that bear against the shoulders to hold the plungers in retracted position and against the cam lugs 183 and 184. Extending upwardly from the reduced portions 185 and 186 are punch pins 189 and 190 having pointed ends 191 (Fig. 14) normally positioned immediately below the tape when the plungers are in retracted position and which are adapted to pierce the tape to form the prongs P when the plungers are moved upwardly against the action of the springs. The cam lugs are carried on rock levers 193 and 194 fixed to a cross shaft 195 that is journalled in the extension 150 of the machine frame. The rocker arms are actuated by lifters 196 and 197 that are carried on a cross shaft 198 that is also journalled in the frame extension 150. The shaft 198 carries an arm 199 that is connected with a link 200, which has its other end connected with an eccentric 201 on a cross shaft 202. Fixed to the cross shaft is a sprocket 203 that is operated from a sprocket 204 on the shaft 105 by chain 205 (see Figs. 2, 6 and 7).

Carried by the lower die block, intermediate the punch pins, is an insert 206 across which the tape is extended and which has a projecting curved surface 207 to form the crimp L in the clasp-blank as later to be described.

The lower die block also has a transverse slot 208 having a width substantially conforming to the depth of the hook N and slidably mounted therein is an elevator 209 having an upper end face 210 arranged to form a continuation of the upper surface of the die block when the elevator is in its uppermost position (see Fig. 10). The elevator is resiliently retained in its uppermost position by a coil spring 211, contained in a recess 212 (Fig. 15) of the lower die block and which is larger than the width of the elevator 209 to form a stop 213 for a foot 214 on the lower end of the elevator.

The upper end of the spring 211 engages under the foot 214 and the lower end seats on the bottom of the recess. The upper face of the die block also has a transverse groove 215 to register with the crimp L when the tape is advanced across the face of the die, as later to be described.

The die block also has a transverse groove 216 at the forward side of the elevator 210 and substantially horizontally aligned therewith at the end of the die block is a groove 217 for a purpose later to be described.

Reciprocably in a vertical recess 218 in the forward end of the lower die block is a slide 219 having a sloping face portion 220. The slide 219 is actuated by a rocker 221 which has one end connected with the slide by a link 222 and the opposite end is engaged with a pin 223 depending from the upper die shoe 224 to operate the slide when the upper die shoe is moved toward the other die shoe as later described. The slide bends the hook M on the clasp-blank to approximately a 45 degree angle when the tongue portion N of the clasp is bent over the end face of the die to a 90 degree angle, as shown in Fig. 10.

The upper die block 164 is resiliently suspended from the upper die shoe 224 by cap screws 164' that have the headed ends thereof slidable in the die shoe and the threaded ends are connected with the die block as shown in Fig. 9. A space is maintained between the die block and the die shoe by springs 164". The upper die shoe is a plate having a substantially flat lower face 223'. The die shoe is slidably supported in alignment with the lower die shoe by corner pins 225 that extend through bushings 226 carried in the upper die plate. The upper die shoe is actuated to bring the die blocks together by means of a ram assembly 227, later described.

Formed in the upper die block in registry with each of the punch pins 189 and 190 is a bore 228, and extending from the top side of the upper die block are counter-bores 229, forming shoulders 230.

Slidably contained within the bores are strippers 231 having heads 232 contained in the counter-bores 229. The heads 232 are yieldingly retained against the shoulders 230 by coil springs 234 seated against the heads 232 and threaded plugs 235 which close the outer ends of the counter-bores as shown in Figs. 10 and 11.

When the dies are in open position, strippers 231 register with the under-face of the die block, but the strippers are pushed upwardly within the upper die block by the projecting ends of the punch pins 189 and 190 when the dies are in closed position as shown in Fig. 11.

Also formed in the upper die block is a slot 236 opening into a recess 237 in the upper face of the die block.

Slidably contained within the slot 236 is a blade or shear 238 having a thickness substantially corresponding to the width of elevator 209, less the thickness of the tape S (see Fig. 15). The shear 238 has a head 239 (Fig. 11) that is fixed to the upper die shoe to retain the forward side of the shear in contact with the forward side of the elevator slot in the lower die block, and to leave ample space on the opposite side of the shear to accommodate the thickness of the tape as the hook M, which has been severed by the shear from the foremost clasp-blank as it is bent downwardly to form the right angular bend as shown in Fig. 15. Also formed in the lower face of the upper die block in registry with the groove 215 is a transverse groove 240 to accommodate the crimp L (Fig. 15). Also formed in the lower face of the upper die block at the respective sides of the transverse groove are recesses 241 for accommodating the prongs P and Q of the cut-off clasp-blank.

Fixed to the under-face of the upper die shoe at the end of the upper die block is a forming lug 242 having a lower end 243 projecting below the lower face of the upper die and adapted to bend the projecting tongue portion of the clasp downwardly to form the 90 degree and 45 degree angle bends of the clasp-blank.

The forming lug 242 is secured to the upper die shoe by cap screws 244 that extend through suitable openings in the die shoe and into threaded openings of the forming lug as shown in Fig. 10.

Extending laterally from the lower die shoe in registry with the cutoff clasp-blank is a horn or rail 245 having upper and end faces 246 and 247 registering with and forming lateral continuations of the upper and end faces of the lower die block and across which the formed clasp blanks are moved in progressive relation by a plunger 248. The plunger 248 has fingers 249 and 250 slidable in the grooves 215, and 217 respectively.

The plunger 248 is reciprocated in timed relation with operation of the dies by a rod 251 which is slidably supported in a bracket 252 mounted on the side of the frame extension 150 (Fig. 12). Also mounted on the frame extension and projecting laterally therefrom are spaced apart arms 253 carrying a rock shaft 254. Fixed to the rock shaft and extending upwardly therefrom is an arm 255 carrying a roller 256 for engaging a head 257 on the projecting end of the rod 251. Fixed to and extending laterally from the shaft 254 in the direction of the machine is a lever arm 258 that is actuated from a transverse rocker shaft 259 which is carried in a bracket 260 mounted on the forward side of the frame extension 150. Fixed on the outer end of the shaft is an arm 261 that is connected with the lever arm 258 through a link 262

(Fig. 1). Fixed to the inner end of the rocker shaft 259 is a downwardly and rearwardly projecting lever 263 carrying a roller 264 engaging the periphery of a cam 265 that is fixed on the cam shaft 105.

The roller is retained in contact with the cam by a coil spring 266 having one end connected to the arm 261 and the other end connected with a part of the frame extension as indicated at 267 (Fig. 7).

The plunger 248 is retracted by the spring 266.

The upper die shoe is moved to and from the lower die shoe by the ram assembly 227 which includes laterally spaced rods 268 and 269 that are slidably mounted in the bolster 167. The upper ends of the rods 268 and 269 are threaded and project through suitable openings in the upper die shoe to mount cushioning springs 270 that are seated on the upper face of the die shoe 224 and have their upper ends seated against washers 271 that are backed by adjusting nuts 272 for controlling action of the cushioning springs 270 in retaining the upper die shoe in contact with stop nuts 273 that are threaded on the ends of the rods at the underside of the die shoe.

The lower ends of the rods 268 and 269 are similarly threaded and extend through the ends 274 of a cross head 275 having a wrist pin 276 formed thereon intermediate the ends 274.

The ends 274 of the cross head 275 are secured to the threaded ends of the rods by jamb nuts 277 engaging the upper and lower sides thereof. The ends 274 of the cross head have rollers 278 and 279 that move within slots 280 of transverse plates 281 and 282 attached to the inner and outer sides of the frame extension. The wrist pin 276 of the cross head is connected with a crank 283 on the cam shaft 105 by means of a connecting rod 284 (Figs. 6 and 7).

The machine is so timed that after formation of each clasp-blank, the plunger 252 acts to move the blanks along the horn 245 until they reach a position in line with the cinching head where the blanks are removed one at a time and carried to a position for application to the stopped envelope.

The blank carrier comprises a rotor 285 (Fig. 8) rotatably mounted on a shaft 286 having one end threaded into a socket 287 that is provided in the lower end of the housing 288 for the plunger 289 of the cinch 137.

The shaft extends forwardly therefrom directly over the applicating station for the clasp-blank and the outer end is supported in an arm 290 of a gooseneck bracket 291 having a foot 292 fixed to the table top.

The housing 288 forms a vertical guide 293 for the plunger and has its lower end 295 supported above the table top by the plates 115 and 116.

The housing supports the plunger 289 with its forwardly projecting clinching foot 296 that pushes the prongs of the clasp through the paper of the envelopes and clinches them against the anvil 111 as later to be described.

The rotor 285 is carried alongside of the horn 245 with the upper periphery 297 thereof in substantial plane with the top face of the horn, while the lower peripheral portion 298 (Figs. 8 and 16) is spaced above the envelope a suitable distance to pass the tongues N of the clasp when the tongues are moving away from the cinch upon withdrawal of the second stop. The end face 299 is spaced forwardly from the forward face of the horn 245 to provide a passageway therebetween for the tongues of the clasp during their transposition from the horn to the applicating position (Fig. 8).

Formed transversely in the peripheral portion of the wheel are a series of equally spaced radial slots 300. Mounted in each slot is a permanent U-shaped magnet 301, the magnet being positioned in the respective slots with the poles 302 and 303 (Fig. 16) inset slightly from the end face 299 of the rotor 285. The sides of the slots 300 are beveled as at 304 to guide the tongues of the clasps into contact with the poles of the magnet when the endmost clasp on the horn is projected toward the magnet which is then registering with the tongue portion of the endmost clasp on the horn.

A push pin 305 that is slidably mounted in an opening 306 of the horn, and has a head 307 slidably mounted in a rearwardly extending counter-bore 308' as shown in Fig. 8. The push pin is normally retained in retracted position by means of a coil spring 309' that is enclosed within the counter-bore and has one end seated against the bottom thereof and its opposite end against the head 307.

The opposite end of the head 307 engages an arm 308 of a rock lever 309 that is pivotally supported for rocking movement in a horizontal plane on a pin 310 that is carried by a fixed bracket 311 attached to the rear side of the horn. The opposite end of the rock lever projects toward the dies and has a roller 313 mounted on the outer end thereof in position to engage the inclined face 314 of a wedge plate 315 that depends from the side of the upper die shoe as best shown in Figs. 6 and 7. Thus on each operation of the die, the rock lever 309 is actuated to cause the pin 305 to push the endmost clasp-blank into engagement with the poles of the magnet after which the plunger 257 comes into operation during the upward movement of the ram so as to advance the blanks along the horn and present the next clasp to the succeeding magnet of the rotor, the rotor having been advanced one space by means of a ratchet pawl 316 engaging the teeth 317 of a ratchet wheel 318 forming a part of the rotor.

The ratchet pawl 316 is pivotally mounted on an upwardly extending arm 319 of a bell crank lever 320 which is pivotally mounted on the transverse arm by means of a pin 321.

The bell crank has a laterally extending arm 322 that is connected through a pin and slot connection 323 with a link 324 that is connected with an ear 325 extending laterally from the upper die shoe so that with each operation of the die, the ratchet wheel 318 rotates one space to move the next magnet into position for engaging the next clasp-blank, the link being provided with a slot 326 to give the required movement to the bell crank (Fig. 5). With each operation of the die shoe, the rotor is advanced until the clasp-blank reaches the position directly in alignment with the clinching foot as shown in Fig. 8.

The clinching foot 296 has spring pressed guide pins 327 and 328 that enter the openings in the clasp which were formed in the making of the prongs P and Q. Downward movement of the clinching foot slides the blank from engagement with the magnet (Fig. 16) and brings the body portion thereof into contact with the envelope, for forcing the prongs P and Q through the paper and into clinching relation with clinching bosses 327' and 328' on the anvil 111.

As the clinching foot moves upwardly on its return movement, the anvil is withdrawn and the second stop moves out of position to allow the envelope to be carried along by the belt.

In order that the magnet wheel is advanced the same amount for each operation of the ratchet 316, the rotor includes an annular flange 329 having notches 330 registering with the magnets of the magnet wheel.

The notches 330 are engaged by a wheel 331 on an arm 332 that is pivoted on the arm 290 of the wheel carrier as indicated at 333. The arm 332 is connected with the arm of the wheel carrier by a spring 334 to bring the wheel 331 into engagement with the uppermost notch 330 and to center the magnet wheel with respect to the clasp applicating portion of the envelope.

The cinching plunger is reciprocated by means of a rocker arm 335 that is pivotally supported on a pin 336 which is carried by an upper extension 337 of the spaced plates 115 and 116 which carry the housing 288 for the cinching head.

The rocker arm 335 is arranged transversely of the machine directly above the clasp horn 245 and has a slotted inner end 338 carrying a slide block 339 that is mounted on a pin 340 extending from the stem of the cinching plunger and which reciprocates through a slot 340' (Fig. 5) in the side of the plunger housing 238 as will be understood.

The opposite end of the rocker arm 335 is pivotally connected as at 341 with a link 342 having its lower end connected through a pin 343 with an arm 344 (Figs. 3 and 17). The arm 344 is pivoted as at 345 to the side frame 4 and the forward end is guided for arcuate movement in a guide 346 that is also attached to the side frame of the machine. The free end of the arm 344 extends beyond the pin connection 343 and carries a roller 347, operating on a cam 348. The cam 348 is fixed on the cam shaft 105.

The arm 344 is held with the roller 347 in contact with the cam 348 by a spring 349 having one end connected with a pin 350 on the arm 344 and its other end connected with the base portion of the machine frame.

The link 342 is composed of upper and lower sections 351 and 352 that are interconnected by a lost motion connection 353 with the sections held in their extended position by a coil spring 354 seated on a head 355 of the lower section and bearing against a collar 356 of the upper section.

Operating above the stopped envelope is a reciprocatory shaft 357 that extends transversely of the machine and has its ends journalled in bearings 358 and 359 that are carried on arms 360 and 361. The arms 360 and 361 are pivoted on brackets 362 (Fig. 3) that are carried by the respective side frames of the machine and which extend forwardly to mount the bearings thereon.

One end of the shaft 357 carries a sprocket 363 that is driven by a chain 364 operating over a drive sprocket 365 on the roller shaft 39. The shaft 357 is reciprocated by a rocker arm 366 pivotally mounted on the side frame of the machine as indicated in Figs. 3 and 17.

The rocker arm 366 has a cam follower 368 engaging a cam 369 on the shaft 105 (Fig. 17). The forward end of the rocker arm is connected by a link 370 with the arm 361. The cam follower 368 is kept in engagement with the cam by a coil spring 371 having one end hooked to the rocker arm and the other to a fixed part of the frame 4, as best shown in Fig. 3.

Mounted on the shaft 357 directly in alignment with the applied clasp is a roller 372 adapted for peripheral contact with the top face of the envelope to cooperate with the roller 36 in assisting in advancing the envelope upon release thereof by the second stop 96 and to bend the tongue portion N of the clasp to an angle of substantially 45 degrees as the clasp passes through a circumferential groove 373 (Fig. 8) in the roller 372. The diameter of the bottom of the groove being such that the tongue portion N of the clasp is pressed toward the body portion a sufficient amount to provide the desired angle of the clasp as the envelope passes into position for completing the clasp by bending the clasp into substantially flat contact with the body portion and seating the hook M to the desired angle.

The envelope is then engaged by a third stop 374 (Figs. 4 and 18). The third stop 374 is carried on the end of a rod 375 that is adjustable within a head 376 similar to the other stops previously described. The head 376 is carried on a rocker arm 377 that is pivotally carried by a bracket 378 mounted on the side of the table top as best shown in Fig. 4.

The arm 377 has a depending portion 379 that is connected with a rocker arm 380 on the shaft 101 (Fig. 18). The rocker arm has a pin and slot connection 381 with the end 379 of the arm 377. The opposite end of the rocker arm 380 carries a cam follower 382 working on a cam 383 on the shaft 105. The rocker arm 380 is kept in contact with the cam by a spring 384 that connects the rear end of the rocker arm with the transverse rail 6 of the machine, as best shown in Fig. 6.

Carried near the pivoted end of the rocker arm 377 is an upwardly and forwardly extending arm 385 carrying a transverse rod 386 mounting an arm 387 which carries a roller 388 that is held in yielding contact with the envelope engaged by the stop by a coil spring 389 having one end connected with a tail portion 390 of the arm 387 and its other end fixed to a pin 391 extending radially of the rod 386 as best shown in Fig. 18.

Mounted adjacent the bracket 378 is a bracket 392 carrying a transverse rocker arm 393 that oscillates above the path of travel of envelopes and which has an end 394 carrying a pressure applying head 395 which has a flange 396 fixed to the side of the arm and its other flange 397 extending underneath and rearwardly of the arm as shown in Fig. 5.

The flange 397 carries pressure pins 399 and 400 that are spaced apart thereon to engage over the folds forming the tongue and hook portions of the clasp so that when the head is moved downwardly and in the direction of a fixed anvil 401, the pins 399 and 400 apply pressure sufficient to give the final bends and complete formation of the clasp. The anvil 401 is supported between the upper runs of the conveyor belts and has a transverse groove 402 in registry with the crimp L so that the pressure applied by the pin 400 does not alter the formation of the crimp.

The rocker 393 is operated from the rocker arm 344 which actuates the clinching head. This is effected through a rocker arm 403 that is pivotally mounted on the side frame of the machine as indicated at 404 and which has the free end connected by a pin 405 with a link 406 that is connected with the outer end of the rocker arm 393 by a pin 407 (Figs. 3 and 17).

The rocker arm 403 is connected with the rocker arm 344 by a link 408 that interconnects the arm through pivot pins 409 and 410 as shown in Fig. 3. The pivot pin 410 has a lost motion connection with the arm 344 to provide a resilient connection with the link through a compression spring 411 that engages a seat 412 on the lever 344 and has its upper end held in compression by a screw 413 adjustably carried in a lug 414 on the link 408 (Fig. 17).

Supported above the path of the envelopes by the plate 116 and a bracket 415 is a longitudinal bar 416 which extends longitudinally above the upper run of a left-hand belt to mount lever arms 417 and 418 carrying rollers 419 and 420 that apply sufficient pressure of springs 421 and 422 to the envelope to assure advance of the envelope upon release of the third stop for discharging the envelope from the ends of the conveyor belt as to a printing machine (not shown) or a station (not shown) where the envelopes are boxed.

The bar 416 has an upwardly offset portion 423 (Fig. 5) in registry with the pressure applying arm previously described, to accommodate movement thereof.

The bar 416 also carries a laterally extending arm 424 which projects over the opposite belt and has a depending portion carrying a runner 425 to cooperate with the rollers 419 and 420 to assure advance of the finished envelope.

In using the machine in practicing the steps of the method, the stack support 9, the station stops 86, 96 and 374, the guide rails 19 and 20, and other parts are adjusted for the size of the envelopes to be run through the machine. A roll of paper tape 52 is carried by the reel 53 and the free end of the tape is threaded between the feed and moistening rollers 57 and extended to the cutoff mechanism.

A roll of metal strip S is applied to the spindle 140 and the strip S is threaded through the guide tube 143 and passed between the rollers 145 and 146 of the measuring device 144 with the end of the tape resting upon the flat upper face 159 of the support 160 to pass under the guide plate 161 and between the pairs of pins 162 and 163. With the motor 50 in operation, the belt 48 is driving the main countershaft 44 which in turn is driving the cam shaft 105 through the chain 107. The conveyor belts 17 and 18 are also operating through the chain 42 and gears 37 and 38.

The vacuum feed 11 is being actuated from the shaft 44 through the chain 74, countershaft 70, sprocket 75, chain 77, and sprocket 76. The secondary cam shaft 67 is operating from the countershaft 70 through the sprocket 69, chain 71, and sprocket 68. This places all of the various actuating mechanisms of the machine in operation through their respective actuating cams and rocker arms as will be described.

The cam 66 on the secondary cam shaft 67 effects rocking movement of the arm 64 and oscillates the pawl 61 through the link connection 63. The pawl 61 engages the teeth on the ratchet 60 and intermittently rotates the feed roller 57 to advance the paper tape from which the washers are formed. Simultaneously, the eccentric 155 on the cam shaft 105 operates the arm 154 through the link 156 swinging the pawl 153 for intermittently advancing the strip feeding rollers 145 and 146 to pass on each operation a sufficient length of strip into the die unit to form a clasp-blank, the timing being such that the strip is fed during the up-stroke of the die ram, or after the die ram has come to rest in its upper position. The die ram is being actuated from the cam shaft 105 through the crank 283, connecting rod 284, and cross head 285. The upper die block is moving in regular periods to and from the lower die block with a stamping action to cut off and form the various initial bends in the clasp-blanks. The strip "S" on being passed between the die blocks is kept in registry with the forming elements thereof by the pairs of guide pins 169 and 170, with the strip passing under the heads thereof to control the strip relatively to the lower die block when the upper die block moves therefrom. The initial operations are to form the prongs P and Q and the transverse bend or crimp L. The prongs are formed by the punch pins 174 and 175 that move upwardly through the strip in timed relation with the ram by means of the lifters 196 and 197 on the rock shaft 198, the lifters raising the arms 193 and 194 to carry the lugs 183 and 184 against the heads 181 and 182 of the plungers 179 and 180 and lift the plungers against action of the springs 185. The mechanism is so timed that the punch pins operate during the dwell at the lower end of the stroke of the ram while the crank is moving across lower dead center position.

The lifter shaft 198 is being operated by the crank 199 and link 200 which is connected with the eccentric 203 on the shaft 202 that is driven from the cam shaft 105 through the chain 205. The operation of the punch pins is therefore kept in timed relation with the operation of the ram as both mechanisms are positively driven from the common shaft 105.

When the upper die block comes into contact with the lower die block the crimp is formed over the surface 207 of the insert 206. When the punch pins move through the strip they act against the stripper 231 to compress the springs 234 so that when the ram lifts the upper die block the springs become effective to push the strip S in contact with the face of the lower die block as the pins are being withdrawn and the upper die block moves away from the lower die block.

On the downward movement of the upper die block the previously punched and crimped clasp-blank is severed and the terminal end thereof is bent at right angles. This is effected through take-up of the springs 164" that resiliently hold the upper die block from the upper die shoe 224 as shown in Fig. 9. The shear blade 238, being carried from the upper die shoe 224, is retracted within the upper die block but on take-up of the spacing between the upper die block and the upper die shoe the shear is projected through the slot 236 and cooperates with the stationary shear edge on the lower die block to cut through the strip S and to bend the terminal hook M downwardly at right angles to the body portion of the strip as best shown in Fig. 15. The shear blade 238 pushes the elevator 209 downwardly against the action of the spring 211 and on upward movement of the ram the upper die shoe moves away followed by the upper die block so that the spring 211 is effective in lifting the elevator to carry the terminal M of the strip above the surface of the lower die block whereupon the next advanced movement of the strip by the feed rollers 145 and 146 move the severed portion of the strip forwardly with the terminal underlying the lug 242. In this position, the severed portion of the strip, the prongs P and Q are accommodated within the recesses 241 of the upper die block and the crimp L is located directly over the guide slot 215 and in position to be engaged by the prong or finger 249 of the plunger 248. On the next down stroke, the lug 242 comes into contact with the projecting portion N of the strip and bends it over the forward face of the lower die block. At the end of the stroke, the slide 219 is effective to bend the terminal M of the strip to an angle of approximately 45 degrees from the portion N. The slide 219 is being actuated in timed relation with the ram by the rocker arm 221 that is actuated by the punch pin 223 which depends from the upper die shoe (Fig. 12).

The foremost clasp-blank is now in its initial form and is advanced laterally onto the horn or rail 245. A preformed blank is pushed onto the horn on each operation of the die ram by the plunger 248, which is being actuated by the rocker arms 255 and 258 through the link 262 which link is being operated by the arm 261 on the shaft 259. The shaft in turn is being rocked by the lever 263 and cam 265 on the cam shaft 105. After each operation the plunger 248 is retracted by the spring 266.

It is obvious that on each stroke of the die ram, a clasp-blank is formed and the formed blank is pushed off the lower die block onto the horn which advances the previously formed blanks until the foremost blank is in position to be engaged by one of the magnets 301 of the rotor 285, which rotor carries the pre-formed blanks into position for application to an envelope that is detained by the second stop 96.

When vacuum is effective in the withdrawal cylinder 11 the lowermost envelope in the stack is withdrawn therefrom and carried around with the cylinder and deposited upon the upper runs of the belts 17 and 18. Upon release of the vacuum, the deposited envelope is carried by the belts into the position where a paper washer I is applied to the innerface of the open flap G of the envelope, the washers having been severed from the moistened end of the paper tape automatically advanced by means of the pawl and ratchet 61 and 62. The stop 86 is actuated from the secondary cam shaft 67 through the cam 93, rocker arm 89, shaft 90 and rod 87, the cam 93 being arranged so that the high-low position effects lift of the rod to carry the stop 86 into a position to engage the bottom edge of the envelope and stop the envelope with the flap G directly under the washer applicator and punch 56. At this station the washer is severed, pushed into contact with the flap, and punched to form the hole J. The punch is being operated by the rocker arm 80, link 82, rocker arm 83, and cam 85 on the shaft 67.

When the washer I is applied the cam 93 moves into position so that the spring 95 is effective in withdrawing the stop 86 and the envelope moves to the clasp applying station where the envelope is detained for the proper time by means of the stop 96, the stop 96 having been moved into position by the cam 104, rocker arm 100, and rod 97. At this station, the body of the envelope is in position directly under the applicator foot of the clasp applicator. While the envelope is moving into position a blast of air from the nozzle 12 blows into the open end of the envelope to raise the back side C from the face side B and permits entrance of the anvil 111 which is carried by the arm 120. The anvil is being moved into position under the applicator foot by the rod 121 which is actuated through the link 127 that is connected to the arm 128 of the bell crank 129. When the cam 133 comes into contact with the roller 132 the bell crank is actuated against action of the spring 134 to move the anvil into position for clinching the prongs as later described.

Getting back to the clasp-blank, the end-most clasp-blank on the horn is removed by the rotor 285 and carried in intermittent steps into position for application.

When the upper die shoe moves downwardly the link 326 rocks the bell crank 315 to swing the pawl 316 to advance the roller one space. The clasp to be removed is pushed into contact with a magnet 301 by movement of the rocker 308 when the cam plate 315 moves into contact with the roller 313. The movement occurs just prior to the advance of the magnet rotor 285. The rotor 285 resiliently held in stopped position by means of the roller 316 which engages one of the dwells 330 in flange 329 of the rotor. A clasp carried by the lowermost magnet on the rotor has been turned through an angle of 180 degrees so that the tongue portion N is upward and the body portion K is extending horizontally directly below the foot 296 of the applicator plunger 289 with the pins 327 and 328 in the foot of the plunger being in position to engage within the openings of the clasp, and the prongs are facing downwardly over the envelope as shown in Fig. 16.

When the applicator plunger moves downwardly the pins 327 and 328 pass through the clasp openings, to align the clasp and the plunger, forcibly slides the clasp from the magnet as shown in Fig. 8, and carries the clasp into contact with the C face of the envelope. The plunger 289 is operated in timed relation by means of the rocker arm 335, link 342 and cam 348 on the cam shaft 105. The force of the plunger pushes the prongs of the clasp through the face of the envelope and they are clinched over the inner face side by contact with the anvil. After operation the parts return to their normal position under action of the spring 349 and the anvil is withdrawn by contraction of the spring 134 as the cam 133 rides from under the roller 132.

The stop 96 now moves out of detaining position so that the rollers 372 and 36 are effective with the belt in advancing the envelope to the last stop 374. As the clasp approaches roller 372, the roller is raised by the link 370 against action of the spring 371. When the cam 369 moves into position for actuating the rocker 366 the roller 372 is lifted, so that as the tongue of the clasp passes through the groove of the roller, the tongue is bent toward the body portion of the clasp.

The advance of the envelope is continued by means of the belts and pressure rollers until the bottom edge of the envelope engages the stop 374 whereupon the arm 394 actuates to carry the pins 399 and 400 into pressing contact with the initial bends in the clasp to complete the formation thereof (see Fig. 21). The pressure is applied to the pins through the rocking of the arm 394 by its link connection with the rocker arm 344. After the pressure is applied the rocker arm returns to its normal position and the stop 374 is withdrawn permitting discharge of the envelope from off the end of the conveyor belts.

If for some reason a clasp-blank is not removed by the plunger of the clinching device, further advance of the rotor 285 brings the clasp past the foot of the plunger 289 and the clasp-blank is removed by the electromagnet 426, which is stronger than the force effected by the permanent magnets 301 (see Fig. 4).

What is claimed is:

1. A method of attaching a clasp to an envelope for securing the closure flap thereof including, forming a section of metal strip into a clasp-blank by punching spaced openings in said strip to provide prongs in an attaching portion of the clasp-blank, forming a crimp transversely of the attaching portion intermediate said openings, bending the strip at substantially right angles to the attaching portion to form a tongue portion, forming a hook on the tongue portion, applying the clasp-blank to the envelope, pressing the prongs through the material of the envelope, clinching the prongs, and then bending the tongue portion over the attaching portion to bring the hook thereof into the crimp.

2. A method of attaching a clasp to an envelope for securing the closure flap thereof including, forming a section of metal strip into a clasp-blank by punching spaced openings in said strip to provide prongs in an attaching portion of the clasp-blank, forming a crimp transversely of the attaching portion intermediate said openings, bending the strip at substantially right angles to the attaching portion to form a tongue portion, forming a hook on the tongue portion, applying the clasp-blank to the envelope, pressing the prongs through the material of the envelope, clinching the prongs, then bending the tongue portion over the attaching portion to bring the hook thereof into the crimp, and flattening the bend to give a predetermined resiliency in said tongue portion.

3. A method of attaching a clasp to an envelope for securing the closure flap thereof including, consecutively providing an envelope, forming a section of metal strip into a clasp-blank by punching spaced openings in said strip to provide prongs in an attaching portion of the clasp-blank, forming a crimp transversely of the attaching portion intermediate said openings, bending the strip at substantially right angles to the attaching portion to form a tongue portion, forming a hook on the tongue portion, applying the clasp-blank to the envelope, pressing the prongs through the material of the envelope, clinching the prongs, bending the tongue portion over the attaching portion to bring the hook thereof into the crimp, and flattening the bend to give a predetermined resiliency in said tongue portion.

4. A method of providing an envelope with a clasp of a type having an attaching portion, prongs projecting from the attaching portion, and a lateral tongue portion extending over the attaching portion and terminating in a hook, said method including moving the envelope into position, applying a clasp blank to the envelope with said tongue portion extending substantially laterally from the attaching portion, pressing the prongs through the material of the envelope, clinching the prongs, and bending the tongue portion from said lateral position to bring the tongue portion over the attaching portion with the hook thereof in substantial contact with the attaching portion.

5. A method of providing an envelope with a clasp of a type having an attaching portion, prongs projecting from the attaching portion, and a lateral tongue portion extending over the attaching portion and terminating in a hook, said method including moving the envelope into position, applying a clasp blank to the envelope with said tongue portion extending substantially laterally from the attaching portion, pressing the prongs through the material of the envelope, clinching the prongs, bending the tongue portion from said lateral position to bring the tongue portion over the attaching portion with the hook thereof in substantial contact with the attaching portion, and flattening the bend of said tongue portion to give a predetermined resiliency to said tongue portion.

6. A method of providing an envelope with a clasp of a type having an attaching portion, prongs projecting from the attaching portion, and a lateral tongue portion extending over the attaching portion and terminating in a hook, said method including moving the envelope into position, applying the clasp to the envelope with said tongue portion extending substantially laterally from the attaching portion and the hook at an inclined angle with respect to the tongue portion, pressing the prongs through the material of the envelope, clinching the prongs, bending the tongue portion from said lateral position to bring the tongue portion over the attaching portion with the inclined hook thereof in substantial contact with the attaching portion, flattening the bend of said tongue portion to give a predetermined resiliency to said tongue portion, and flattening the bend of said hook portion to complete shaping of the hook portion.

7. The method of providing envelopes with clasps for securing apertured flaps of the envelopes in closed position, said method including feeding the envelopes separately from each other with the flaps in open position, feeding a continuous metal strip in synchronism with the feed of the envelopes, punching spaced openings in the strip to provide prongs in an attaching portion of a clasp blank near the end of the strip, bending the end of the strip to form a hook portion, bending the strip at substantially right angles to the attaching portion to form a tongue portion having the hook, severing a fastening portion from the strip to complete formation of the clasp blank, positioning the attaching portion of the clasp blank on the envelope, pressing the prongs through the material of the envelope, clinching the prongs, then bending the tongue portion over the attaching portion to bring the hook thereof substantially into contact with said fastening portion, and flattening the bend of said tongue portion to give a predetermined resiliency in the tongue portion.

8. The method of providing envelopes with clasps for securing apertured flaps of the envelopes in closed position, said method including feeding the envelopes separately from each other with the flaps in open position, feeding a continuous metal strip in synchronism with feed of the envelopes, punching spaced openings in the strip to provide prongs in an attaching portion of a clasp blank near the end of the strip, forming a crimp transversely of the attaching portion, bending the end of the strip to form a hook portion, bending the hooked end of the strip at substantially right angles to the attaching portion to form a tongue portion having the hook, severing the fastening portion from the strip to complete formation of the clasp blank, positioning the attaching portion of the clasp blank on the envelope, pressing the prongs through the material of the envelope, clinching the prongs, then bending the tongue portion over the attaching portion to bring the hook thereof into the crimp, and flattening the bend of said tongue portion to give a predetermined resiliency in the tongue portion.

9. The method of providing envelopes with clasps for securing apertured flaps of the envelopes in closed position, said method including feeding the envelopes separately from each other with the flaps in open position, feeding a continuous metal strip in synchronism with the feed of the envelopes, punching spaced openings in the strip to provide prongs in an attaching portion of a clasp blank near the end of the strip, forming a crimp transversely of the attaching portion, bending the end of the strip to form a hook portion, bending the hooked end of the strip at substantially right angles to the attaching portion to form a tongue portion, severing the fastening portion from the strip to complete formation of the clasp blank, positioning the attaching portion of the clasp blank on the envelope, pressing the prongs through the material of the envelope, clinching the prongs, bending the tongue portion over the attaching portion to bring the hook thereof into the crimp, flattening the bend of said tongue portion to give a predetermined action in the tongue portion, and slightly flattening the hook against said attaching portion to complete formation of the hook.

10. The method of providing envelopes with clasps for securing apertured flaps of the envelopes in closed position, said method including feeding the envelopes separately with the flaps in open position, feeding a continuous metal strip in synchronism with the envelopes, punching openings in the strip from the under side of the strip to provide upwardly projecting prongs in an attaching portion of a clasp blank near the end of the strip, bending the end of the strip downwardly to form a hook, bending the strip downwardly at substantially right angles to the attaching portion to form a tongue portion having the hook, severing the fastening portion from the strip to complete formation of the clasp blank, inverting the clasp blank, positioning the attaching portion of the clasp blank on the envelope, pressing the prongs through the material of the envelope, clinching the prongs, then bending the tongue portion over the attaching portion, and flattening the bend in said tongue portion to give a predetermined resiliency in the tongue portion.

11. The method of providing envelopes with clasps for securing apertured flaps of the envelopes in closed position, said method including feeding the envelopes separately with the flaps in open position, feeding a continuous metal strip in synchronism with the envelopes, punching spaced openings in the strip from the under side of the strip to provide upwardly projecting prongs in an attaching portion of a clasp blank near the end of the strip, forming an upwardly curving crimp transversely of the attaching portion, bending the end of the strip downwardly to form a hook, bending the strip downwardly at substantially right angles to the attaching portion to form a tongue portion having the hook, severing the fastening portion from the strip to complete formation of the clasp blank, inverting the clasp blank, positioning the clasp blank with the attaching portion on the envelope, pressing the prongs through the material of the envelope, clinching the prongs, then bending the tongue portion over the attaching portion to bring the hook thereof into the crimp, flattening the bend of said tongue portion to give a predetermined resiliency in the tongue portion, and shaping the hook in said crimp portion.

12. The method of providing envelopes with clasps for securing apertured flaps of the envelopes in closed position, said method including feeding the envelopes separately with the flaps in open position, feeding a continuous metal strip in synchronism with the envelopes, punching openings in the strip from the under side of the strip to provide upwardly projecting prongs in an attaching portion of a clasp blank near the end of the strip, forming an upwardly curving crimp transversely of the attaching portion, bending the end of the strip downwardly at substantially right angles to form initially a hook portion, bending the portion of the strip having said hook portion downwardly at substantially right angles to the attaching portion to form a tongue, bending the hook portion to substantially 45° relatively to the tongue portion, severing the fastening portion from the strip to complete formation of the clasp blank, inverting the clasp blank, positioning the clasp blank with the attaching portion on the envelope, pressing the prongs through the material of the envelope, clinching the prongs, then bending the tongue portion over the attaching portion to bring the hook over the crimp, flattening the bend in said tongue portion to give a predetermined resiliency in the tongue portion, and completing formation of the hook in said crimp by applying pressure on the tongue portion over the hook.

References Cited in the file of this patent

UNITED STATES PATENTS

| | | |
|---|---|---|
| 1,289,740 | Hahn | Dec. 31, 1918 |
| 1,343,648 | Smith | June 15, 1920 |
| 1,497,339 | McCann | June 10, 1922 |

(Other references on following page)

UNITED STATES PATENTS

| | | |
|---|---|---|
| 1,424,831 | Kux | Aug. 8, 1922 |
| 1,615,195 | Swab | Jan. 18, 1927 |
| 1,743,364 | Liss | Jan. 14, 1930 |
| 1,764,638 | McKeon | June 17, 1930 |
| 1,931,155 | Pearce | Oct. 17, 1933 |
| 2,024,763 | Heywood | Dec. 17, 1935 |
| 2,053,490 | Novick | Sept. 8, 1936 |
| 2,392,159 | La Place | Jan. 1, 1946 |
| 2,659,406 | Locke | Nov. 17, 1953 |